US010055199B2

(12) United States Patent
Baril et al.

(10) Patent No.: US 10,055,199 B2
(45) Date of Patent: Aug. 21, 2018

(54) TRANSPARENT NODE RUNTIME AND MANAGEMENT LAYER

(71) Applicant: NodeSource, Inc., Anaheim, CA (US)

(72) Inventors: Bryce B. Baril, Portland, OR (US); Daniel D. Shaw, San Francisco, CA (US); Roderick D. Vagg, Ulladulla (AU); Joseph I. McCann, Austin, TX (US); Gavon A. Renfroe, Austin, TX (US); Thorsten Lorenz, Houston, TX (US); Trevor J. Norris, Salt Lake City, UT (US); Elijah F. Insua, Brooklyn, NY (US); Fountain L. Ray, III, Austin, TX (US)

(73) Assignee: NodeSource, Inc., Anaheim, CA (US)

( * ) Notice: Subject to any disclaimer, the term of this patent is extended or adjusted under 35 U.S.C. 154(b) by 218 days.

(21) Appl. No.: 15/040,309

(22) Filed: Feb. 10, 2016

(65) Prior Publication Data

US 2017/0228217 A1 Aug. 10, 2017

(51) Int. Cl.
*G06F 9/44* (2018.01)
*G06F 8/20* (2018.01)
*G06F 11/34* (2006.01)

(52) U.S. Cl.
CPC .......... *G06F 8/20* (2013.01); *G06F 11/3466* (2013.01)

(58) Field of Classification Search
None
See application file for complete search history.

(56) References Cited

U.S. PATENT DOCUMENTS

| | | | |
|---|---|---|---|
| 6,658,453 B1 * | 12/2003 | Dattatri | G06F 11/3495 709/202 |
| 9,183,116 B1 * | 11/2015 | Ajith Kumar | G06F 11/3636 |
| 9,516,053 B1 * | 12/2016 | Muddu | H04L 63/1425 |
| 9,746,551 B2 * | 8/2017 | Scholten | A61B 5/0002 |
| 2003/0196136 A1 * | 10/2003 | Haynes | G06F 11/0715 714/13 |
| 2005/0039171 A1 * | 2/2005 | Avakian | G06F 11/3495 717/127 |
| 2005/0039187 A1 * | 2/2005 | Avakian | G06F 11/3476 719/310 |
| 2005/0216421 A1 * | 9/2005 | Barry | G06F 11/0709 705/64 |
| 2009/0119549 A1 * | 5/2009 | Vertes | G06F 11/3414 714/47.1 |

(Continued)

*Primary Examiner* — Matthew J Brophy

(57) ABSTRACT

A server computer. The server computer comprises a processor, a non-transitory memory, a application comprising JavaScript instructions stored in the non-transitory memory, a runtime stored in the non-transitory memory, and a native agent module stored in the non-transitory memory. When executed by the processor, the runtime provides a JavaScript execution environment for executing the application and an instrumentation application programming interface (API). When executed by the processor outside of the runtime, the native agent module monitors memory buffers allocated to the application based on accessing the instrumentation API of the runtime, executes an event loop that sends an interrupt to the runtime, and provides reporting based on monitoring the memory buffers and the interrupt sent to the runtime to a management layer external to the server computer.

17 Claims, 6 Drawing Sheets

(56) References Cited

U.S. PATENT DOCUMENTS

| | | | | |
|---|---|---|---|---|
| 2010/0325474 A1* | 12/2010 | Gopinath | | G06F 11/2038 714/4.1 |
| 2012/0041638 A1* | 2/2012 | Johnson | | G07C 5/008 701/33.1 |
| 2012/0144374 A1* | 6/2012 | Gallagher | | G06F 11/3466 717/128 |
| 2013/0268257 A1* | 10/2013 | Hu | | G06F 17/5009 703/22 |
| 2014/0095945 A1* | 4/2014 | Sankaran | | G06F 11/0754 714/51 |
| 2014/0281304 A1* | 9/2014 | Hoffman | | G06F 9/45554 711/162 |
| 2014/0298041 A1* | 10/2014 | Consalus | | G06F 21/602 713/193 |
| 2014/0317603 A1* | 10/2014 | Gataullin | | G06F 11/3636 717/128 |
| 2015/0082283 A1* | 3/2015 | Smith | | G06F 11/3692 717/125 |
| 2015/0172151 A1* | 6/2015 | Bottalico | | H04L 43/08 709/224 |
| 2015/0227362 A1* | 8/2015 | Dvinsky | | G06F 8/70 717/120 |
| 2015/0281035 A1* | 10/2015 | Melikyan | | H04L 67/42 709/224 |
| 2015/0378756 A1* | 12/2015 | Lensmar | | G06F 8/53 717/148 |
| 2015/0378864 A1* | 12/2015 | Lensmar | | G06F 8/53 717/130 |
| 2016/0078347 A1* | 3/2016 | Salajegheh | | G06N 5/04 706/12 |
| 2016/0105328 A1* | 4/2016 | Cooper | | G06F 3/0484 715/736 |
| 2016/0112245 A1* | 4/2016 | Mankovskii | | H04L 41/069 709/204 |
| 2016/0266998 A1* | 9/2016 | Gautallin | | G06F 11/3466 |
| 2016/0323160 A1* | 11/2016 | Melikyan | | G06F 3/067 |
| 2017/0033980 A1* | 2/2017 | Naous | | H04L 43/12 |
| 2017/0123818 A1* | 5/2017 | Roth | | G06F 9/4425 |
| 2017/0185424 A1* | 6/2017 | Cooper | | G06F 9/4443 |

* cited by examiner

TRANSPARENT NODE RUNTIME AND MANAGEMENT LAYER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Node.js is a single-threaded JavaScript runtime environment that employs non-blocking event driven I/O. Node.js may be referred to sometimes simply as "Node." Node is a server-side programming environment that is used to build scalable network programs. Node is conventionally considered to comprise a V8 JavaScript virtual machine, libuv low-level system bindings and primitives for the Node event loop, and Node.js libraries.

SUMMARY

In an embodiment, a server computer is disclosed. The server comprises a processor, a non-transitory memory, an application comprising JavaScript instructions stored in the non-transitory memory, a runtime stored in the non-transitory memory, and a native agent module stored in the non-transitory memory. When executed by the processor, the runtime provides a JavaScript execution environment for executing the application and an instrumentation application programming interface (API). When executed by the processor outside of the runtime, the native agent module monitors memory buffers allocated to the application based on accessing the instrumentation API of the runtime, executes an event loop that sends an interrupt to the runtime, and provides reporting based on monitoring the memory buffers and the interrupt sent to the runtime to a management layer external to the server computer.

In another embodiment, a method of executing a JavaScript application is disclosed. The method comprises initiating a process on a first computer, where the process comprises a runtime that provides a JavaScript execution environment for a JavaScript application and an instrumentation application programming interface (API) for a native agent module, the JavaScript application that executes in the runtime, and the native agent module that executes on the first computer outside of the runtime and accesses the instrumentation API of the runtime to monitor the runtime and the JavaScript application. The method further comprises sending a request from a console application executing on a second computer to the native agent, where the request identifies information monitored by the native agent, receiving information from the native agent by the console application, and analyzing the received information by the console application to determine a current performance of the JavaScript application. The method further comprises, based on the analysis of performance of the JavaScript application, sending a command to the native agent module by the console application and providing a command input to the runtime by the native agent module based on the command sent by the console application, whereby the runtime and the JavaScript application are monitored and controlled by the console application.

In yet another embodiment, a method of managing a plurality of JavaScript processes is disclosed. The method comprises initiating a plurality of processes on a first computer system, where each process comprises a runtime that provides a JavaScript execution environment for a JavaScript application and an instrumentation application programming interface (API) for a native agent module, the JavaScript application that executes in the runtime, and the native agent module that executes on the computer system outside of the runtime and accesses the instrumentation API of the runtime to monitor the runtime and the JavaScript application. The method further comprises receiving registrations of the native agents of the plurality of processes by a hub application that executes on a second computer system, in response to each native agent registration, creating by the hub application an entry in a hub registry data store associated with the native agent that identifies at least one identifier associated with the native agent and a communication address of the native agent, receiving heartbeat messages from native agents by the hub application, and removing an entry from the hub registry data store in response to determining that a heartbeat message has not been received from a native agent associated with an entry in the hub registry data store for at least a predefined length of time. The method further comprises receiving a message from a management console by the hub application, where the message from the management console identifies at least one native agent, looking up by the hub application a communication address of the native agent, and sending the message from the management console by the hub application to the identified native agent at the looked-up communication address of the native agent, whereby the processes on the first computer system are managed and monitored by the management console.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
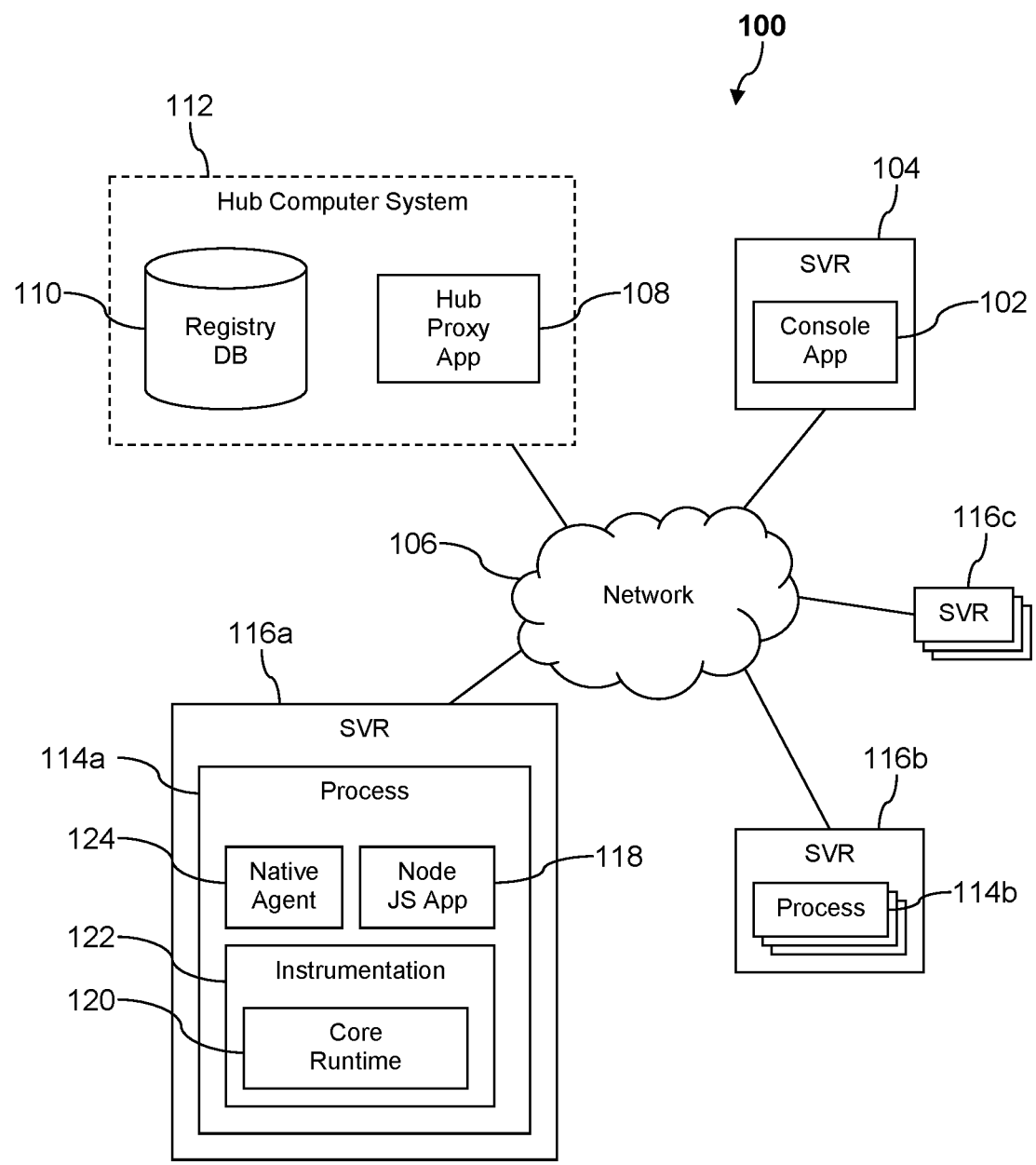
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A computing system comprising an enhanced computing runtime environment and a new management layer is taught by the present disclosure. The runtime provides a non-blocking event-driven I/O JavaScript runtime environment that extends the conventional long-term support (LTS) Node.js runtime in a number of ways to make executing node applications in the runtime more manageable and more transparent, thereby overcoming a known shortcoming of conventional Node.js runtimes—a lack of transparency that is sometimes referred to as a "blackbox" runtime. The system further provides a management layer or support environment for the runtime environment that provides increased command and control capability for individual node runtimes and further for a cluster of node runtimes.

The system extends the Node.js runtime by extending its existing application programming interface (API) and by adding additional API calls not present in the conventional Node.js instrumentation API. This extended runtime may be referred to as a core runtime or an N|Solid runtime. The core runtime can be conceptualized as an internal core runtime encapsulated within an instrumentation layer. The core runtime extends Node.js by adding monitoring of buffer memory allocation. Conventional JavaScript tools and Node.js do not support monitoring buffers because buffer memory is provided outside the heap in "raw memory." The memory buffer information can be propagated up to the management layer to provide enhanced visibility into buffer memory state and operations. This enhanced visibility into buffer memory can promote more effective detection and remediation of memory leak problems. The core runtime extends Node.js by capturing additional event loop information such as event handles associated with code file names and line numbers in the code files where event call backs are located, a feature not supported by conventional Node.js. This extended event loop information can be propagated up to the management layer to support node application debugging activity.

The core runtime extends Node.js by incorporating additional security related API calls, for example hooks for imposing security restrictions on node applications. The security restrictions can include limiting access to the filesystem or specific parts of a file system, allocation of memory, and others. The core runtime further monitors inclusion of modules by node applications, capturing module name, capturing module version, and calculating a checksum over the included module. The core runtime then propagates the module name, module version, and module checksum up to the management layer where this information can be compared against a blacklist of deprecated modules and/or module versions and against a canonical or authoritative checksum associated with the included module. This can be used to identify an included module that poses an elevated security risk.

The system further comprises a native agent that executes in a thread outside of the core runtime thread but in the same process as the core runtime. Each core runtime is associated with a node application that runs in the core runtime and a native agent that is coupled to the node application through the core runtime. A computer application, such as a web server, may be implemented as one or more of these processes, where each process comprises a node application, an associated core runtime, and an associated native agent.

The agent implements an event loop that is similar to an event loop in the core runtime. The agent executes outside of the core runtime and has access into the instrumentation layer encapsulating the core runtime. Because it executes outside the core runtime, the agent can interrupt and query the core runtime when it is blocked by busy work. The agent can read information from its own memory space related to an executing node application, can interrupt and query the core runtime, and can place an event on the event processing queue of the event loop of the core runtime, thereby affecting the on-going processing of the node application. Because it executes outside of the core runtime, activity of the agent does not perturb the operation of the node application or the core runtime by its very monitoring activity.

The system further comprises a hub component that couples to each of the node processes via its agent in a one-to-many relationship (i.e., a single hub component couples to a plurality of node processes). The system further comprises a management console that provides a user application programming interface for accessing the monitoring and control. The hub monitors the health of the agents which register with the hub and send a periodic heartbeat signal to the hub. If the hub fails to receive a timely heartbeat from an agent, it removes the agent from the registry. The hub manages the details of accessing the processes and provides an abstract access method to the management console. The hub supports the abstraction of a cluster of node processes. The cluster membership may be defined explicitly via the management console or according to properties shared among cluster members, such as a same node application script, a related node application name, or other shared properties. The hub supports receiving commands directed to a cluster and broadcasting the command to each of the cluster members (i.e., each node process). The hub supports broadcasting commands to all node processes, via the agent associated with each node process.

The management console performs a variety of monitoring and analysis functions on the instrumentation and metrics information retrieved by the agents from the node process with which they are associated. For example, the management console can present a variety of views of the current processing state of node processes. The management console can identify outlier node processes. An outlier node process is a node process that deviates from the normal or average performance of other node processes, for example consuming substantially more CPU cycles or substantially less CPU cycles than an average CPU cycle consumption of peer node processes or consuming substantially more or less memory than an average memory consumption of peer node processes. The management console can identify outlier cluster members, for example for troubleshooting and/or control actions.

The present disclosure teaches an improvement of a computer system. The object of the innovation is a computer runtime environment and is embodied in a computer system. The innovation improves this computer system in a number of ways including providing greater visibility into the execution of the runtime environment, greater control effectivity, improved security controls over the runtime, and greater convenience for users of the runtime system.

Turning now to FIG. 1, a computing system 100 is described. In an embodiment, the system 100 comprises a management console application 102 that executes on a management server computer 104. The console application 102 communicates with a hub computer system 112 via a network 106. The network 106 comprises one or more private communication networks, one or more public communication networks, or a combination thereof. In an embodiment, the hub computer system 112 comprises a hub proxy application 108 that executes on the hub computer system 112 and a registry data store 110. The hub computer system 112 may comprise one or more computers, for example one or more server computers. The registry data store 110 may execute on a first one or more server computers and the hub proxy application 108 may execute on a second one or more server computers. Alternatively, the registry data store 110 and the hub proxy application 108 may execute on the same server computer. The hub computer system 112 may be referred to in some contexts as the hub 112. In an embodiment, a user may access the console application 102 via a web interface extended by the console application 102 to a workstation (not shown) employed by the user. Alternatively, the user may interact with the console application 102 using a remote terminal (not shown).

The management console application 102, the management server 104, and the hub 112 may be considered to comprise a management layer that manages one or more node processes (i.e., processes that comprise an executing JavaScript node application). In an embodiment, the system further comprises one or more node process servers 116, for example a first node process server 116a, a second node process server 116b, and a third node process server 116c. It is understood that the system 100 may comprise any number of node process servers 116.

Each node process server 116 executes one or more node processes 114. As illustrated in FIG. 1, the first node process server 116 executes a single first node process 114a and the second node process server 116b executes a plurality of second node processes 114b. Each node process 114 comprises a node JavaScript application 118 that executes in a core runtime 120 or that executes in the context of the core runtime 120. The core runtime 120 may be referred to in some contexts as a node runtime, but it will be appreciated that this node runtime or core runtime 120 is distinct from conventional node runtimes in a variety of ways described further hereinafter. The node runtime 120 is encapsulated within or extends an instrumentation application programming interface 122. Each node process 114 further comprises a native agent 124 that will be referred to herein as the agent 124. The native agent 124 executes in one or more threads that is different from the thread in which the node application 118 executes. The node application 118 and the node runtime 120 are single threaded.

The management layer and/or the hub proxy application 108 manages and monitors the node processes 114 via the agents 124. The processes 114 may implement any desired functionality. In an embodiment, the processes 114 may implement a web server. The agent 124 may be implemented as a native application, for example coded in C++, in C, or in some other computer programming language. The agent 124 can send commands to the node application 118 and/or the core runtime 120 via the instrumentation API 122. The agent 124 may read data values, state values, heap memory, and other information associated with the node application 118 and/or the core runtime 120 via the instrumentation API 122. The agent 124 may send an interrupt event to the core runtime 120 via the instrumentation API 122 which may break the core runtime 120 out of a programming step or loop that doesn't complete, out of an infinite loop, or out of a lengthy processing step. The agent 124 may place an event on an event loop of the core runtime 120 that the core runtime 120 will process in normal order.

Figure 2:
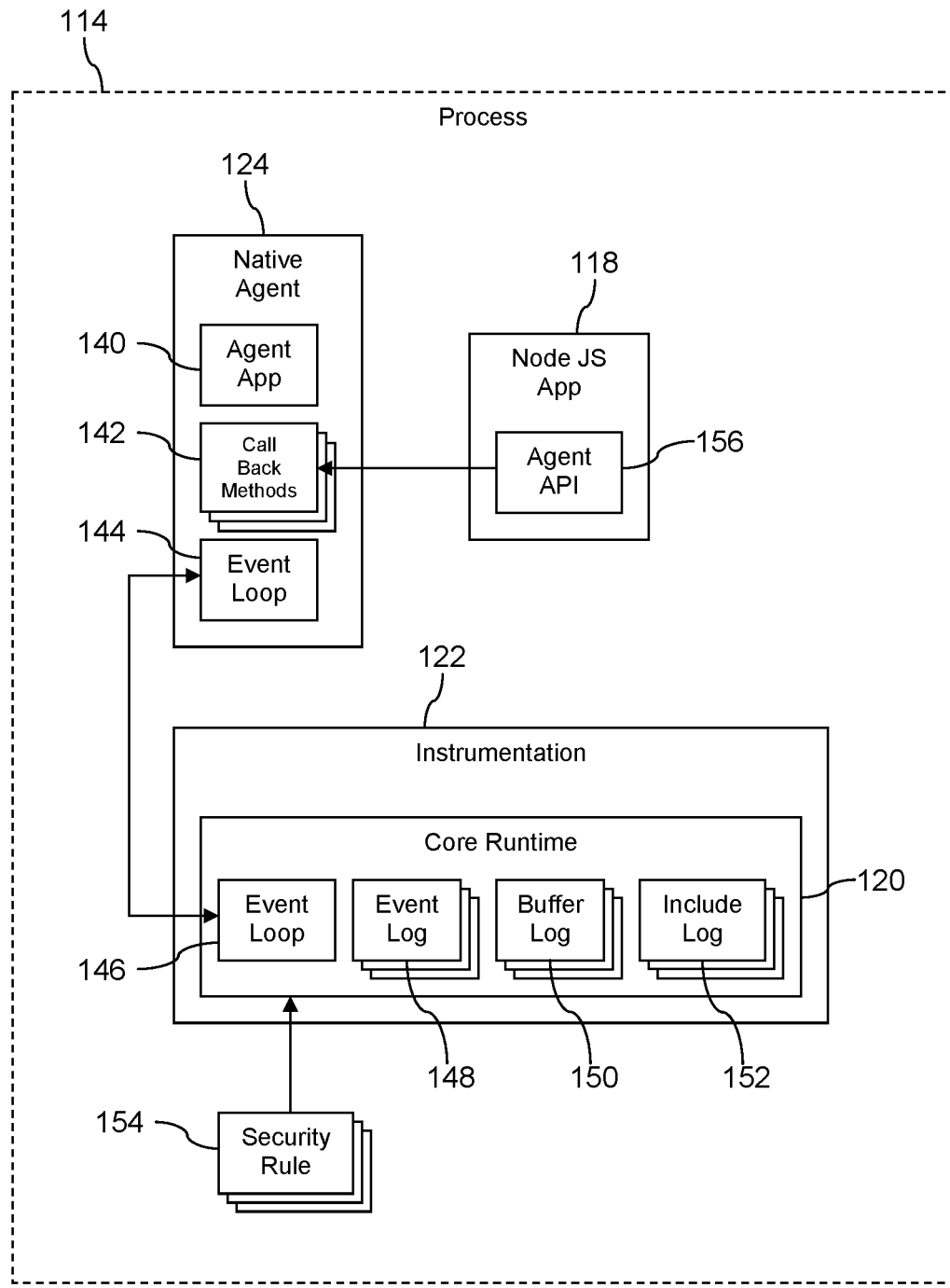
FIG. 2 is a block diagram of a Node process according to an embodiment of the disclosure.

Turning now to FIG. 2, further details of the node process 114 are described. In an embodiment, the agent 124 comprises an agent application 140, one or more call back functions 142, and an agent event loop 144. The core runtime 120 may comprise a runtime event loop 146, a plurality of event logs 148, a plurality of memory buffer logs 150, and a plurality of module include logs 152. The node application 118 may comprise an agent API 156 as well as the base functionality provided by the node process 114 (e.g., the base functionality of a web server). The process 114 may further comprise one or more security rules 154 that are read from a configuration file stored in a memory of the server 116 during initiation of the process 114 and provisioned into the core runtime 120. It is understood that in some embodiments of the system 100, some of the features and components illustrated in and described with reference to FIG. 2 may not be supported.

When events are generated by the node application 118, events are placed on the runtime event loop 146. At the same time, the node runtime 120 creates an event log 148 that comprises an event handle, an identifier of the code file of the node application 118 that generated the event, and a line number in the code file that generated the event. The event logs 148 may be read by the agent 124 via the instrumentation API 122. Alternatively, in an embodiment, the instrumentation API 122 pushes the event logs 148 to the agent 124 as the event logs 148 are created. The agent 124 can provide the event logs 148 or a summary of the event logs 148 to the management layer, for example to the hub proxy application 108 and/or to the console application 102.

The core runtime 120 supports two forms of dynamic memory allocation: heap memory allocation and buffer memory allocation. Buffer memory allocation is used to store binary data such as files read from a disk, data read from a communication interface, and a cryptographic hash value. Because JavaScript did not initially support dynamic allocation of binary memory (because, historically, JavaScript was developed for use with Web Browsers, and Web Browsers generally do not employ dynamic allocation of binary memory space), Node.js runtimes allocate memory buffers for such binary data in "raw memory" outside of the heap memory allocated to the process 114 and leave a reference to these memory buffers in the heap memory. Such buffer memory can be a source of memory leaks which are not easily detected or identified with conventional tools developed for use with JavaScript and/or conventional Node.js runtimes. The present disclosure teaches the core runtime 122 creating memory buffer logs 150 that are created at the time of dynamic allocation of memory buffers to the node application 118 and extends access to the memory buffer logs 150 via the instrumentation API 122 to the agent 124. Thus, the agent 124 can access the memory buffer logs 150 and transmit the memory buffer logs 150 or a summary of memory buffer logs 150 up to the management layer, for example up to the hub proxy application 108 and/or the console application 102. This extension of the core runtime 120 supports more robust and rigorous monitoring of memory buffer allocation than was previously available in the conventional Node.js runtime.

As the node application 118 executes it may include code from other modules such as library modules. This may happen most commonly during initialization of the node application 118, but includes can be performed later after the node application 118 has been executing in the process 114. When the core runtime 120 performs an include on behalf of the node application 118, it creates an include log 152 that identifies the name of the included module and a version identity of the included module. The core runtime 120 or the node application 118 may calculate a checksum over the contents of the included module and store the checksum in the include log 152. The core runtime 120 may push the include logs 152 via the instrumentation API 122 to the agent 124. The agent 124 may push these include logs 152 or a summary of the include logs 152 up to the management layer, for example to the hub proxy application 108 and/or the console application 102. The include logs 152 may be examined by the management layer, for example by the console application 102, and compared to a blacklist of modules that are deemed insecure or known malware. The console application 102 may further compare the checksum of the include logs 152 propagated up by the agent 124 to a canonical or authoritative checksum defined in a whitelist of modules.

When the node runtime 120 initializes it may read the security rules 154, for example from a file stored in a non-transitory memory of the server 116. The security rules 154 may define constraints or limitations on the access to computer resources that the node runtime 120 makes available to the node JavaScript application 118. For example, the security rules 154 may limit access to the filesystem by the node JavaScript application 118, limit access to portions of the filesystem by the node JavaScript application 118, may limit allocation of memory by the node JavaScript application 118, and may limit access to I/O resources by the node JavaScript application 118.

The instrumentation API 122 may provide access to the agent 124 to obtain a variety of information about the core runtime 120 and/or the node application 118. The agent 124 may learn a process identity, how much memory the node application 118 is using, the CPU utilization of the node application 118, the environment settings of the node application 118, and the like. The instrumentation API 122 may provide the agent 124 the ability to turn on or turn off profiling operations.

The node application 118 can build in an agent API 156 that enables the node application 118 to invoke call back methods 142 on the agent 124. For example, an exception handler of the node application 118 may invoke a call back method 142 of the agent 124 that collects information about the instant state of the node application 118 and/or the core runtime 120 before the node application 118 terminates. It is understood that the call back methods 142 may implement a variety of functionality related to or unrelated to node application exception handling. The call back methods 142 may provide a method to control a level of reporting by the agent 124 and/or a frequency of report transmission by the agent 124.

The agent 124, for example the agent application 140, executes outside of the core runtime 120. The agent 124, unlike the core runtime 120 and node application 118, need not be single threaded. Because the agent 124 does not execute inside the core runtime 120, operations of the agent 124 do not impact the execution of the core runtime 120 and/or the node application 118. For example, because the agent 124 executes outside of the core runtime 120, the monitoring activities of the agent 124 does not encumber or overload the core runtime 120, does not reduce the efficiency or performance of the core runtime 120 or the node application 118.

The agent 124, as described above, can read from the node runtime 120 and/or node application 118 via the instrumentation API 122. The agent 124, further, can interact with the core event loop 146 via the agent event loop 144. For example, the agent 124 can place an event on the agent event loop 144 that has the effect of putting an event on the node event loop 146. Additionally, the agent 124 can put an event on the agent event loop 144 that generates an interrupt of the core runtime 120. This is possible because the agent 124 is outside of the core runtime 120 and does not execute in the core runtime 120. Interrupting the core runtime 120 in this way allows the agent 124 to break the core runtime 120 out of an infinite loop or out of a very long running calculation.

With reference again to FIG. 1, the management layer controls and monitors node processes 114 via communication with the agents 124, for example via a network socket connection to an agent 124. It is understood, however, that a different communication paradigm may be used by the management layer to communicate with the agent 124. In an embodiment, the agents 124 register with the hub 112, and an entry associated with the agent 124 and/or the node process 114 associated with the subject agent 124 is created in the registry data store 110. The agent application 140 may periodically send a message to the registry data store 110 to keep the entry in the registry data store 110 active. In an embodiment, if the agent 124 does not timely send a message (e.g., a heartbeat message or a handshake message) to the registry data store 110, the registry data store 110 may automatically delete the entry for the agent 124 and/or corresponding node process 114 from the registry data store 110.

The entry for the node process 114 and/or the agent 124 in the registry data store 110 may comprise a name of the node process 114 and/or the node application 118. The entry may further comprise a cluster name associated with the node process 114. The cluster name may be shared in common with a plurality of node processes 114 and/or node applications 118. For example, different node applications 118 may perform different parts of a single task. Alternatively, different node applications 118 may be different instances of the same node application code or image. The entry may further comprise a communication address by which the hub 112 can communicate with the node process 114 and/or the agent 124, for example an IP address and port number.

The console application 102 may support a user interface that allows an administrator to monitor and control a system of node processes 114. The console application 102 may allow a user to send a single command directed to a cluster of node applications 114, and the hub proxy application 108 determines the node processes 114 that are members of the cluster, determines the communication addresses of the member node processes 114 and/or agents 124 of the member node processes 114, and sends out the command to each of the member node processes 114 and/or member agents 124 at the appropriate communication address. The console application 102 may request data from a cluster, and the hub proxy application 108 can retrieve the requested data from the member node processes 114 and/or agents 124 and return this to the console application 102.

The console application 102 can analyze this information on the cluster members and present the data in a way that promotes ease of identifying deviant performance of cluster members, for example identifying outlier performance. The console application 102 may determine performance averages or medians of node processes 114, for example average or median CPU cycle consumption, average or median memory consumption, average or median I/O access, and the like. The console application 102 may then represent node processes 114, for example node processes 114 that are members of the same cluster, in a display window so as to graphically depict the central tendencies of computer system resource utilization by node processes 114 and to exhibit any node processes 114 that are outliers in some resource consumption. An outlier may consume resources either excessively or deficiently. It is noted that a node process 114 that consumes a deficiency of I/O resources may be stuck or deadlocked.

The console application 102 can analyze information received from an agent 124 to determine a current performance of the node JavaScript application 118 and compare the current performance to a generalized performance of a set of peer node JavaScript applications 118. The generalized performance of the set of peer node JavaScript applications 118 may be determined as an average or median CPU cycle consumption, an average or median memory consumption, and/or an average or median I/O access. The console application 102 can depict the performance of the node JavaScript application 118 compared to the generalized performance of the set of peer node JavaScript application 118 on a user interface display provided by the console application 102. The performance of the node JavaScript application 118 may be presented as a point in a two-dimensional plane defined by a memory consumption axis and a CPU cycle consumption axis in the user interface display. The performance of the other peer node JavaScript applications 118 likewise may each be presented as a point in the two-dimensional plane defined by the memory consumption axis and the CPU cycle consumption axis in the user interface display.

It is contemplated that node process 114 performance and/or resource consumption may be depicted as points defined on a two axis grid of one resource consumption metric versus a second resource consumption metric, for example memory consumption versus CPU cycle consumption. Other graphical modes of depicting resource consumption of node processes 114 comprise a starburst display pattern, a flame graph display pattern, and a tree map display pattern.

Figure 3:
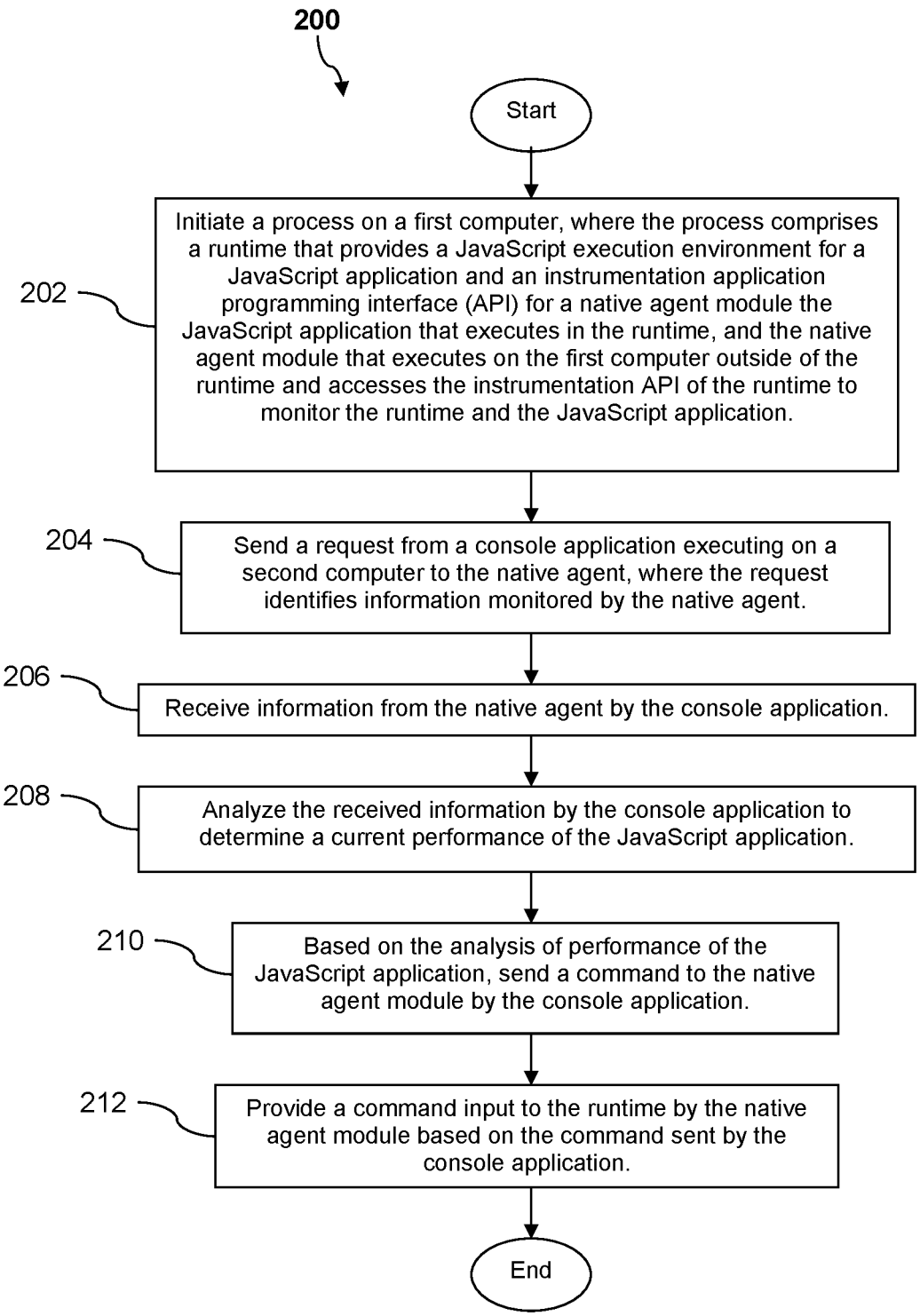
FIG. 3 is a flow chart of a method according to an embodiment of the disclosure.

Turning now to FIG. 3, a method 200 is described. At block 202, initiate a process on a first computer, where the process comprises a runtime that provides a JavaScript execution environment for a JavaScript application and an instrumentation application programming interface (API) for a native agent module, the JavaScript application that executes in the runtime, and the native agent module that executes on the first computer outside of the runtime and accesses the instrumentation API of the runtime to monitor the runtime and the JavaScript application. In an embodiment of method 200, the runtime is a node runtime and the JavaScript application is a node JavaScript application. The node runtime may be referred to as a core runtime or an N|Solid runtime.

At block 204, send a request from a console application executing on a second computer to the native agent, where the request identifies information monitored by the native agent. At block 206, receive information from the native agent by the console application. At block 208, analyze the received information by the console application to determine a current performance of the JavaScript application. At block 210, based on the analysis of performance of the JavaScript application, send a command to the native agent module by the console application. At block 212, provide a command input to the runtime by the native agent module based on the command sent by the console application.

The method 200 may further comprise analyzing the received information by the console application to identify modules included by the JavaScript application; comparing the included modules to a list of black listed modules by the console application; and generating by the console application a notification that one of the included modules is a black listed module. The method 200 may further comprise comparing by the console application a checksum associated with the included modules included in the received information to an authoritative checksum associated with the included modules and generating by the console application a notification that the checksum associated with one of the included modules does not compare with the authoritative checksum associated with the included module.

Figure 4A:
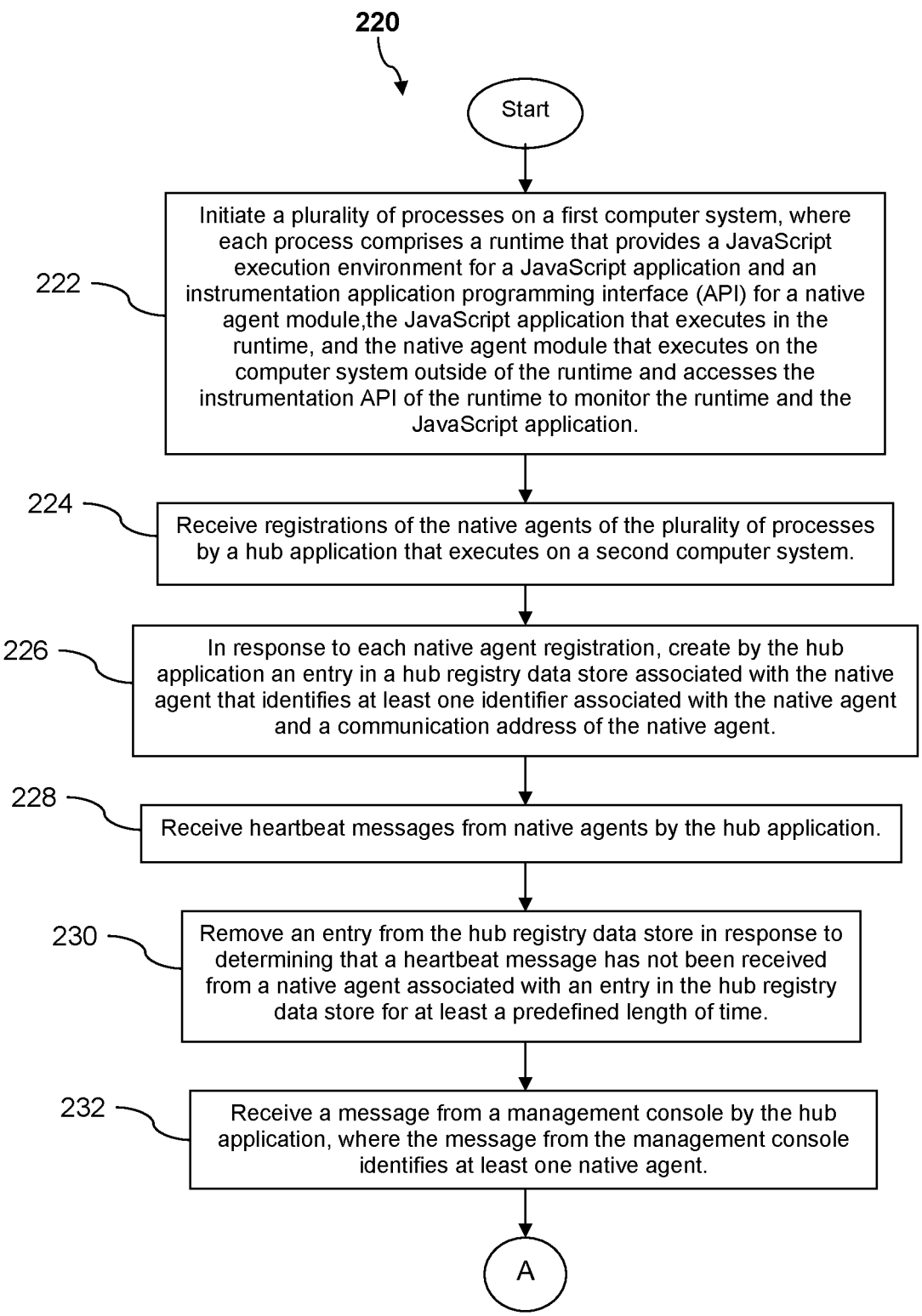
FIG. 4A and FIG. 4B are a flow chart of another method according to an embodiment of the disclosure.
Figure 4B:
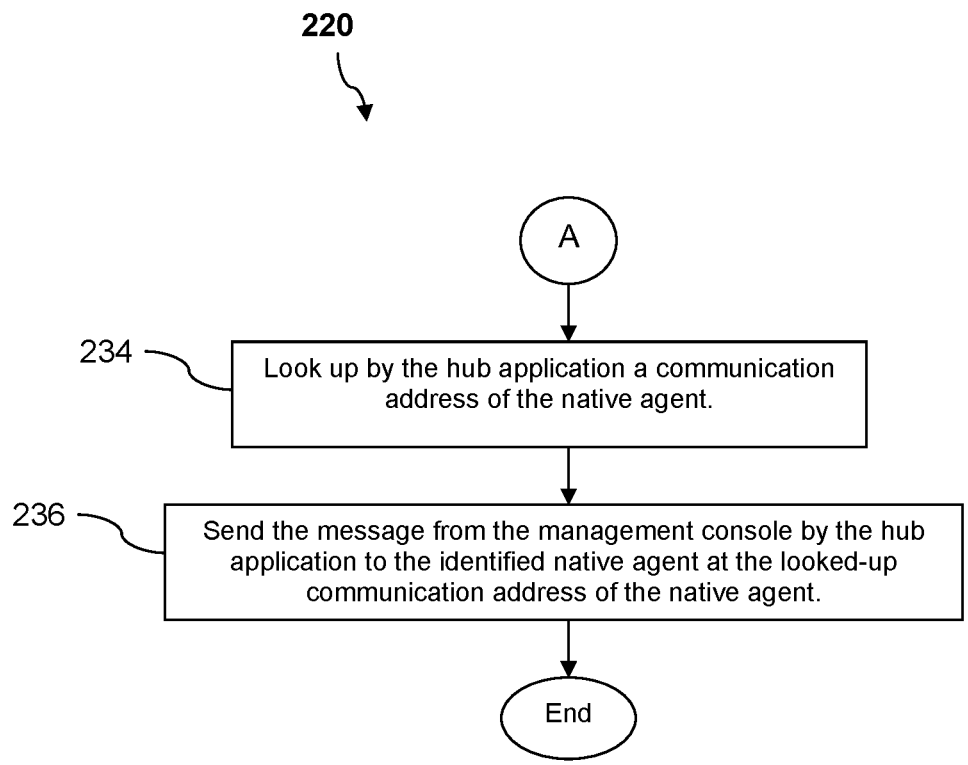

Turning now to FIG. 4A and FIG. 4B, a method 220 is described. At block 222, initiate a plurality of processes on a first computer system, where each process comprises a runtime that provides a JavaScript execution environment for a JavaScript application and an instrumentation application programming interface (API) for a native agent module, the JavaScript application that executes in the runtime, and the native agent module that executes on the computer system outside of the runtime and accesses the instrumentation API of the runtime to monitor the runtime and the JavaScript application. In an embodiment of method 220, the runtime is a node runtime and the JavaScript application is a node JavaScript application. The node runtime may be referred to as a core runtime or an N|Solid runtime.

At block 224, receive registrations of the native agents of the plurality of processes by a hub application that executes on a second computer system. At block 226, in response to each native agent registration, create by the hub application an entry in a hub registry data store associated with the native agent that identifies at least one identifier associated with the native agent and a communication address of the native agent. At block 228, receive heartbeat messages from native agents by the hub application. At block 230, remove an entry from the hub registry data store in response to determining that a heartbeat message has not been received from a native agent associated with an entry in the hub registry data store for at least a predefined length of time.

At block 232, receive a message from a management console by the hub application, where the message from the management console identifies at least one native agent. In an embodiment, the message from the management console identifies a cluster of native agents and/or a cluster of JavaScript applications or processes 114. At block 234, the hub application looks up a communication address of the native agent. If the message from the management console identifies a cluster of native agents or processes 114, the hub application looks up the communication address of each of the native agents associated with the cluster. The hub application can look up communication addresses of native agents based on a cluster name or cluster identity associated with the native agent 124 in the associated entry for the native agent 124 in the registry data store 110. At block 236, send the message from the management console by the hub application to the identified native agent at the looked-up communication address of the native agent. If the message from management console identifies a cluster of native agents 124 and/or processes 114, the hub application 108 sends the message to each of the native agents 124 and/or processes 114 identified as belonging to the subject cluster.

Figure 5:
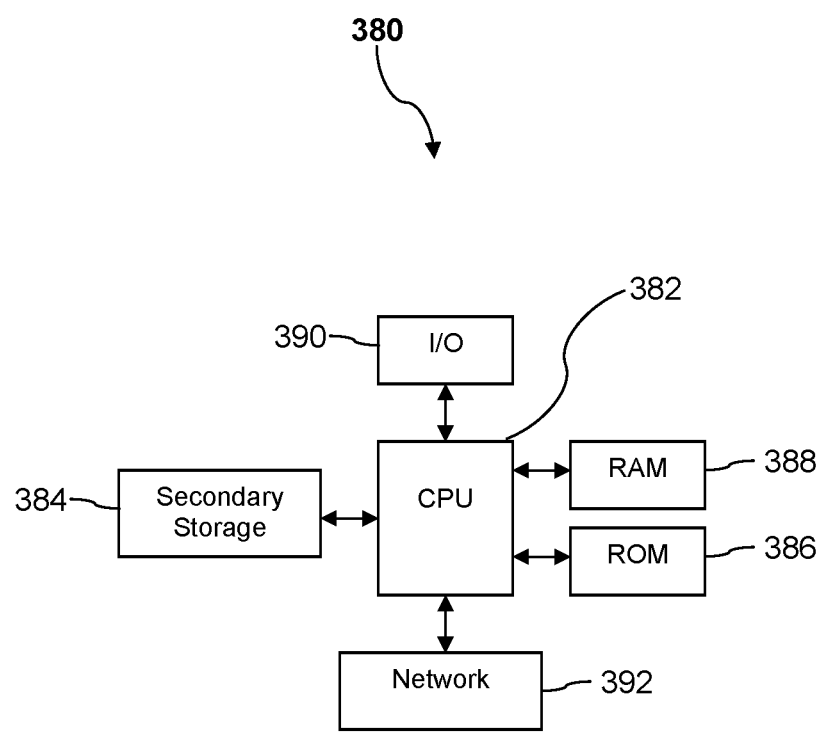
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A server computer, comprising:
   a processor;
   a non-transitory memory, wherein the non-transitory memory stores a plurality of security rules;
   an application comprising JavaScript instructions stored in the non-transitory memory;
   a runtime stored in the non-transitory memory that, when executed by the processor,
      provides a JavaScript execution environment for executing the application and an instrumentation application programming interface (API),
      reads the security rules from the non-transitory memory, and
      provides the JavaScript execution environment for executing the application according to constraints defined by the security rules; and
   a native agent module stored in the non-transitory memory that, when executed by the processor outside of the runtime
      monitors memory buffers allocated to the application based on accessing the instrumentation API of the runtime,
      executes an event loop that sends an interrupt to the runtime, and
      provides reporting based on monitoring the memory buffers and the interrupt sent to the runtime to a management layer external to the server computer.

2. The server of claim 1, wherein the runtime, when executed by the processor, creates memory buffer logs at the time of dynamic allocation of memory buffers to the application and wherein the native agent module monitors memory buffers by accessing the memory buffer logs via the instrumentation API of the runtime.

3. The server computer of claim 1, wherein the native agent module comprises call back methods and wherein the application comprises an agent application programming interface that the application, when executed by the processor, invokes to cause the native agent module, when executed by the processor, to execute one of the call back methods of the agent.

4. The server computer of claim 1, wherein the runtime, when executed by the processor, creates an include log that identifies the name of a module included by the application and wherein the native agent module, when executed by the processor, accesses the include log via the instrumentation API of the runtime and provides the include log in the reporting sent to the management layer external to the server computer.

5. The server computer of claim 1, wherein the native agent module, when executed by the processor, registers with the management layer external to the server computer and sends a heartbeat message periodically to the management layer external to the server computer.

6. The server computer of claim 1, wherein the runtime, when executed by the processor, creates event logs associated with events on a runtime event loop, wherein the event logs comprise an event handle, an identifier of a code file of the application that generated the event, and a line number in the code file that generated the event, and wherein the native agent module, when executed by the processor, accesses the event log via the instrumentation API of the runtime and provides the event log in the reporting sent to the management layer external to the server computer.

7. A method of executing a JavaScript application, comprising:
   initiating a process on a first computer, where the process comprises
      a runtime that provides a JavaScript execution environment for a JavaScript application and an instrumentation application programming interface (API) for a native agent module,
      the JavaScript application that executes in the runtime, and
      the native agent module that executes on the first computer outside of the runtime and accesses the instrumentation API of the runtime to monitor the runtime and the JavaScript application;
   monitoring, by the native agent module, memory buffers allocated to the Javascript application at a time of a dynamic allocation of the memory buffers based on accessing the instrumentation API of the runtime, wherein the memory buffers are outside of a heap memory;
   sending a request from a console application executing on a second computer to the native agent module, where the request identifies information monitored by the native agent module, wherein the information comprises information on the memory buffers;
   receiving the information from the native agent module by the console application;
   analyzing the received information by the console application to determine a current performance of the JavaScript application;
   based on the analysis of performance of the JavaScript application, sending a command to the native agent module by the console application; and
   providing a command input to the runtime by the native agent module based on the command sent by the console application,
   whereby the runtime and the JavaScript application are monitored and controlled by the console application.

8. The method of claim 7, wherein analyzing the received information by the console application to determine the current performance of the JavaScript application further comprises comparing the current performance of the JavaScript application to a generalized performance of a set of peer JavaScript applications.

9. The method of claim 8, further comprising depicting the performance of the JavaScript application compared to the generalized performance of the set of peer JavaScript applications on a user interface display provided by the console application.

10. The method of claim 9, wherein the performance of the JavaScript application is presented on the user interface display as a point in a two-dimensional plane defined by a memory consumption axis and a CPU cycle consumption axis and the performance of the set of peer JavaScript applications are presented on the user interface display as points in the two-dimensional plane defined by the memory consumption axis and the CPU cycle consumption axis.

11. The method of claim 7, further comprising sending a request to interrupt the runtime from the console application to the native agent module, whereby the native agent module causes the runtime to breakout of one of an infinite loop or a lengthy processing step.

12. The method of claim 7, further comprising
   analyzing the received information by the console application to identify modules included by the JavaScript application;
   comparing the included modules to a list of black listed modules by the console application; and
   generating by the console application a notification that one of the included modules is a black listed module.

13. The method of claim 12, further comprising:
   comparing by the console application a checksum associated with the included modules included in the received information to an authoritative checksum associated with the included modules; and
   generating by the console application a notification that the checksum associated with one of the included modules does not compare with the authoritative checksum associated with the included module.

14. A method of managing a plurality of JavaScript processes, comprising:
   initiating a plurality of processes on a first computer system, where each process comprises
      a runtime that provides a JavaScript execution environment for a JavaScript application and an instrumentation application programming interface (API) for a native agent module,
      the JavaScript application that executes in the runtime, and
      the native agent module that executes on the computer system outside of the runtime and accesses the instrumentation API of the runtime to monitor the runtime and the JavaScript application;
   receiving registrations of the native agent modules of the plurality of processes by a hub application that executes on a second computer system;
   in response to each native agent module registration, creating by the hub application an entry in a hub registry data store associated with the native agent module that identifies at least one identifier associated with the native agent module and a communication address of the native agent module;
   receiving heartbeat messages from native agent modules by the hub application;
   removing an entry from the hub registry data store in response to determining that a heartbeat message has not been received from a native agent module associated with an entry in the hub registry data store for at least a predefined length of time;

identifying a cluster comprising a plurality of JavaScript applications, wherein each JavaScript application of the plurality of JavaScript applications share a common property;

receiving a message from a management console by the hub application, where the message from the management console identifies the cluster;

looking up, by the hub application, a communication address of the each native agent module associated with each JavaScript application of the plurality of JavaScript applications in the cluster based on the cluster identified in the message from the management console; and sending the message from the management console by the hub application to each identified native agent module at the looked-up communication address of each native agent module, whereby the processes on the first computer system are managed and monitored by the management console.

15. The method of claim 14, wherein the communication address of the native agent modules identified in the entries in the hub registry data store comprises an internet protocol (IP) address.

16. The method of claim 15, wherein the communication address of the native agent modules further comprises a protocol port number.

17. The method of claim 14, wherein the plurality of processes on the first computer system implement a web server functionality.

* * * * *